Sept. 11, 1956
W. E. ALEXANDER
2,762,453
SEPARATION OF ACETYLENE GASES
Filed Nov. 1, 1951
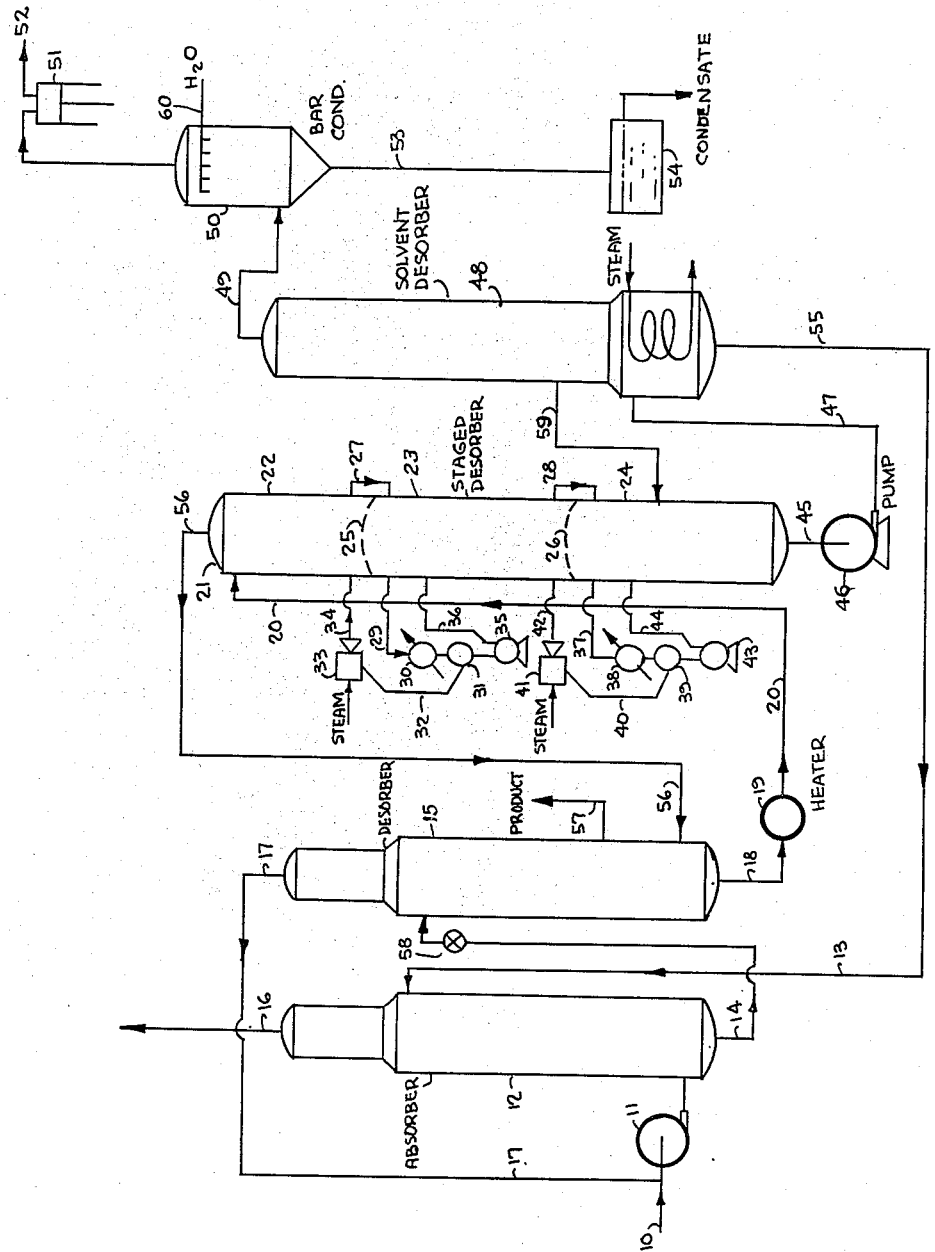
*INVENTOR.*
WAYNE E. ALEXANDER
BY

United States Patent Office 2,762,453
Patented Sept. 11, 1956

2,762,453

SEPARATION OF ACETYLENE GASES

Wayne E. Alexander, Texas City, Tex., assignor to Monsanto Chemical Company, St. Louis, Mo., a corporation of Delaware Application November 1, 1951, Serial No. 254,387

2 Claims. (Cl. 183—115)

This invention relates to a chemical process whereby acetylene is concentrated by solution in an organic solvent.

An object of this invention is the provision of an efficient process whereby acetylene occurring in dilute gas mixtures is recovered in a more concentrated form.

Methods for the recovery and concentration of acetylene occurring in dilute gas mixtures employing a variety of selective solvents are well known to the art. Among the materials which have been suggested as solvents are esters of carbonic acid, e. g., diethylcarbonate, liquid aliphatic ketones, e. g., cyclohexanone, polyglycols and ethers or esters thereof, lactones, e. g., gamma-butyrolactone and its homologues, methyl formamide, dimethylacetamide, etc.

Of particular interest in the present invention are those oxygen-containing organic solvents having a higher boiling point than water and which furthermore are miscible with water. It is not necessary that these solvents be miscible with water in all proportions. On the other hand, if the solvent is miscible to the extent that it dissolves up to 10% or 15% by weight of water under the conditions employed in the process, the substance is generally satisfactory for the present purpose.

In the present process, as also in prior known processes, the dilute acetylene-containing gases are compressed and then passed into contact with an oxygen-containing organic solvent for acetylene. The solvent containing dissolved acetylene is subjected to desorption which may take place at successively lower pressures and with or without being subjected to increasing temperatures. Since the desorption of the solvent is carried out step-wise, in a series of zones wherein the solvent is subjected to said progressively lower pressures (and if desired subjected to correspondingly higher temperatures) the gases evolved are compressed and returned to the next higher pressure zone. A process of this type is disclosed in U. S. Patent 2,250,925.

I have now found that the evolution of acetylene from the solvent is more readily accomplished and a purer product obtained if the solvent is contacted with a mixture of steam and acetylene under such conditions that a part at least of the steam is condensed in the solvent and is dissolved therein. The acetylene contained in the gas mixture may be pure or crude acetylene recovered in another part of the process, or it may be acetylene evolved from the adjacent lower pressure stage of the process.

The dilute acetylene which is to be treated according to the present process may be derived from any source. For example, it may occur as cracked gas obtained from a thermal hydrocarbon cracking process wherein the gases have been subjected to a high temperature as, for example, by treatment in an electric arc. It may also be obtained from the partial combustion of hydrocarbons with oxygen. It may even be obtained as a dilute gas which has been employed or obtained as a waste gas from any chemical operation and from which it is desired to recover the same in a concentrated form for further use.

In particular the invention comprises the process and apparatus for treating in a series of stages under successively diminished pressures a solution of an oxygen-containing liquid solvent containing dissolved acetylene whereby acetylene is liberated from said solution in stages under successively diminished pressure the so-liberated acetylene is entrained with a high velocity steam jet (thermo-compressor) and the mixture of steam and acetylene is injected into a higher pressure stage. Thus, the high velocity steam jet serves not only to withdraw acetylene from one stage of the process but also to compress the so-withdrawn acetylene and to inject the same into a higher pressure stage. At the same time the injected steam also serves to increase the temperature of the solution thus supplying heat necessary for the desorption process.

Reference is made to the accompanying schematic drawing illustrating a flow sheet suitable for carrying out the present invention.

In the drawing, numeral 10 indicates a source of dilute acetylene flowing to compressor 11, wherein the pressure of the gas is raised to 5 or more atmospheres. The compressed gas passes to absorber 12, where it is contacted with an acetylene solvent entering the absorber by pipe 13. The solvent, saturated with acetylene (and other less soluble gases) leaves by pipe 14 and flows into desorber 15. The gases unabsorbed in the solvent in absorber 12 leave by pipe 16 and may be treated for the recovery of any valuable hydrocarbons contained therein.

In desorber 15 pressure upon the gas is reduced approximately to atmospheric pressure, whereupon a release of the less soluble non-acetylenic constituents takes place. Such release unavoidably carries some acetylene into the desorbed gas. Such desorbed gas, by reason of its content of acetylene, is recycled by pipe 17 to pipe 10 and thereby again subjected to the absorptive treatment in absorber 12.

The solvent containing the major portion of the dissolved acetylene leaves desorber 15 by pipe 18 and enters heater 19 where the temperature is raised. The heated solution flows by pipe 20 and enters a staged desorber 21. In this device, which consists of a bubble plate (or other gas-liquid contact means) column divided into a number of stages or zones, desorption is carried out at a progressively decreasing pressure in each stage. In column 21, three separate zones, numbered, respectively 22, 23 and 24, are shown which are formed by separating diaphragms 25 and 26. Connecting pipe 27 serves to conduct liquid only from stage 22 to stage 23, while pipe 28 serves to conduct liquid only from stage 23 to stage 24.

The gases liberated in stage 23 are withdrawn by pipe 29, enter water-cooled condenser 30, then pass to liquid-gas separator 31. The gases therein separated from the liquid are conveyed by pipe 32 to steam actuated injector or thermo-compressor 33, thence by pipe 34 into stage 22. Condensed liquid collecting in 31 flows to pump 35 and is thereby returned to stage 23 by pipe 36.

Similarly the gases liberated in stage 24 are withdrawn by pipe 37, flow to water-cooled condenser 38, thence to liquid-gas separator 39. The gases separated from the liquid then flow by pipe 40 to steam actuated injector 41, thence by pipe 42 and into stage 23. Condensed liquid collecting in 39 flows to pump 43 and is returned to stage 24 by pipe 44. It will be obvious that any number of stages may be employed for this process, the three stages shown herein constituting a practical number.

The liquid collecting in the base of stage 24 leaves by pipe 45, enters pump 46 and is then conveyed by pipe 47 into the base of solvent desorber 48. This device is provided with steam heating means and with gas-liquid contact means in the tower portion. In this device, the water present in the solvent is boiled off under diminished pressure. The water vapor together with any acetylenic polymers remaining in the solvent (e. g., diacetylene, allylene, etc.) are drawn off through pipe 49 and enter a barometric condenser 50. Cold water is supplied to condenser 50 at 60, while the pressure is reduced in the condenser 50 and desorber 48 by vacuum pump 51. The acetylenic polymer substances which are not condensed in condenser 50 are thus discharged to the atmosphere from pipe 52. Such polymers now being in concentrated form are explosive and inflammable and care should be taken in further handling of the same. The waste gas obtained in many of the processes which may be carried out by this invention, has a substantial fuel value, such value may be recovered by burning the gas under boilers, thus furnishing steam for operation of the plant. If desired, the acetylene polymers may be drawn into a gas actuated jet as disclosed in copending application Serial No. 254,388, filed November 1, 1951, now Patent No. 2,715,947, issued August 23, 1955.

The water condensed in barometric condenser 50 flows downwardly by pipe 53 into sump 54, from which point it may be disposed of in any desired manner.

The solvent which has been dehydrated in 48 leaves by pipe 55 and is returned to pipe 13 for reuse in the system.

The gases liberated in zone 22 of staged desorber 21 are passed into the lower part of desorber 15 by means of pipe 56. The product which is acetylene of high purity is obtained as a side stream from desorber 15 by means of pipe 57.

*Example*

A gas mixture obtained by the partial combustion of methane with oxygen and containing the following constituents in mole per cent:

| | Percent |
|---|---|
| $C_2H_2$ | 8.7 |
| $CH_4$ | 4.4 |
| $CO$ | 26.0 |
| $CO_2$ | 4.0 |
| $H_2$ | 54.5 |
| Argon, acetylene polymers, etc. | Balance |
| | 100.0 | is compressed to 100 p. s. i. g. in compressor 11 and then scrubbed in absorber 12 with a solution of dimethyl formamide containing about 1% of water. A solution containing approximately 1.2% by weight of acetylene together with minor amounts of methane, carbon monoxide, carbon dioxide and hydrogen, as well as diacetylene and other acetylene polymers is obtained in the absorber and passed through pipe 14, valve 58 and into desorber 15. An overhead gas containing not more than 0.2% of acetylene leaves absorber 12 by pipe 16.

In desorber 15 the pressure of the gas in contact with the solution is reduced to approximately atmospheric pressure, the temperature being about 80° F. to 100° F., with the result that the major proportion of the less soluble non-acetylenic gases are flashed off. These less soluble gases then flow through pipe 17 and are recompressed and returned to the absorber 12.

The dimethyl formamide solution leaving the desorber 15 by pipe 18 passes through heater 19, wherein the temperature is raised to approximately 200° F., and then conducted into zone 22 constituting the upper part of staged desorber 21. The pressure in this zone is about 7 p. s. i. g. The gases flashed from the solvent in this zone contain about 98.8% of acetylene and are returned to the base of desorber 15 by means of pipe 56.

The solution treated in zone 22 flows through pipe 27 into zone 23, wherein the pressure has been reduced to about 500 mm. The gases evolved in this zone are withdrawn through pipe 29, passed into condenser 30 and liquid gas separator 31. From here they are drawn into pipe 32 by the action of steam jet 33, mixed with steam, compressed and reintroduced by means of pipe 34 into zone 22. At the same time the steam accompanying the gases is partly condensed in zone 22, liberating heat of condensation and dissolving in the solvent, whereby additional acetylene is expelled from the solution.

The solution treated in zone 23 flows through pipe 28 into zone 24, wherein the pressure has been reduced to about 160 mm. and the temperature maintained at about 190° F. The gases liberated in this zone are withdrawn through pipe 37, passed through condenser 38, liquid-gas separator 39 and forced into zone 23 by the action of steam injector 41. Any condensate accompanying the gases withdrawn is returned to zone 24 by pump 43.

At this point in the process the solvent has been substantially completely freed of acetylene. It has, however, gained approximately 1% of water due to the injection and condensation of steam in the prior desorption stages. It still, however, contains some acetylene polymers which are less volatile than is the acetylene itself.

The solution is next pumped to solvent desorber 48 by means of pump 46 and pipe 47, where it is subjected to a temperature of about 240° F. at a pressure of 200 mm. Under these conditions approximately one-half of the contained water and most of the diacetylene are volatilized. A side stream consisting of water vapor flows by pipe 59 into stage 24, serving to liberate dissolved gas in the solution contained therein. The solvent containing about 1% of water is returned to the absorber for reuse in the process. The evolved vapors enter barometric condenser 50, are subjected to a cooling water spray and the water vapor condensed. Any uncondensed diacetylene is drawn into vacuum pump and discharged to the atmosphere for disposal by burning or otherwise.

It will be realized that staged desorber 21 may be replaced by three individual units arranged side-by-side and corresponding to the individual stages shown. A more compact arrangement providing some economy in material and operation is obtained with the design shown above.

There are certain features and sub-combinations disclosed herein which are of utility without reference to other features and sub-combinations. Such features are contemplated by and are within the scope of my claims. It will be obvious that various changes and modifications may be made in the details without departing from the spirit of the invention.

What I claim is:

1. A process for treating a solution of an oxygen-containing organic solvent containing dissolved acetylene, said solvent having a boiling point above that of water, which comprises introducing said solution into the first of a series of desorbing stages, said stages being maintained under reduced pressure and each stage being maintained at a pressure lower than the pressure in the preceding stage, transferring said solution from the first stage successively to each of the succeeding stages of lower pressures while entraining the gases evolved in each of the succeeding stages with a high velocity steam jet and discharging the same into the solution contained in the next preceding stage of higher pressure thereby condensing at least part of said steam therein, withdrawing acetylene from the first stage and withdrawing said solvent substantially free of acetylene from the stage of lowest pressure.

2. A process for recovering acetylene from gas mixtures containing the same in admixture with non-acetylenic gas which comprises compressing the gas mixture, scrubbing the same with an oxygen-containing organic solvent having a boiling point above that of water, to form a solution thereof, reducing the pressure on said solution whereby said non-acetylenic gas is flashed off from said solution, introducing the resultant solution containing dissolved acetylene into the first of a series of desorbing stages, said stages being maintained under reduced pressure and each stage being maintained at a pressure lower than the pressure in the preceding stage, transferring said solution from the first stage successively to each of the succeeding stages of lower pressure while entraining the gases evolved in each of the succeeding stages with a high velocity steam jet and discharging the same into the solution contained in the next preceding stage of higher pressure thereby condensing at least part of said steam therein, withdrawing acetylene from the first stage and withdrawing said solvent substantially free of acetylene from the stage of lowest pressure.

References Cited in the file of this patent

UNITED STATES PATENTS

| Number | Name | Date |
|---|---|---|
| 1,422,182 | Curme | July 11, 1922 |
| 1,900,655 | Metzger | Mar. 7, 1933 |
| 2,073,446 | Ellsberg | Mar. 9, 1937 |
| 2,104,754 | Randel | Jan. 11, 1938 |
| 2,146,448 | Scott et al. | Feb. 7, 1939 |
| 2,217,429 | Balcar | Oct. 8, 1940 |
| 2,250,716 | Legatski | July 29, 1941 |
| 2,250,925 | Babcock | July 29, 1941 |
| 2,325,577 | Balcar | July 27, 1943 |
| 2,355,588 | Brandt | Aug. 8, 1944 |
| 2,371,908 | Morris | Mar. 20, 1945 |
| 2,447,834 | Balcar | Aug. 24, 1948 |
| 2,608,270 | McDonald et al. | Aug. 26, 1952 |

OTHER REFERENCES

Hasche, abstract of application Serial No. 633,843, published February 7, 1950, 631 O. G. 283, class 183–115.